(12) United States Patent
Himmelfreundpointner

(10) Patent No.: US 9,074,768 B2
(45) Date of Patent: Jul. 7, 2015

(54) METHOD AND DEVICE FOR DELIVERING DELIVERABLE MATERIALS

(76) Inventor: Kurt Himmelfreundpointner, Scharten (AT)

( * ) Notice: Subject to any disclaimer, the term of this patent is extended or adjusted under 35 U.S.C. 154(b) by 32 days.

(21) Appl. No.: 13/144,712

(22) PCT Filed: Jan. 14, 2010

(86) PCT No.: PCT/EP2010/000175
§ 371 (c)(1),
(2), (4) Date: Jul. 15, 2011

(87) PCT Pub. No.: WO2010/081703
PCT Pub. Date: Jul. 22, 2010

(65) Prior Publication Data
US 2011/0280672 A1   Nov. 17, 2011

(30) Foreign Application Priority Data
Jan. 15, 2009   (AT) ........................ 54/2009

(51) Int. Cl.
*B65G 33/00*   (2006.01)
*F23K 3/00*   (2006.01)
*B65G 37/00*   (2006.01)
*F27D 3/08*   (2006.01)

(52) U.S. Cl.
CPC . *F23K 3/00* (2013.01); *B65G 37/00* (2013.01); *F23K 2203/201* (2013.01); *F23K 2203/202* (2013.01); *F27D 3/08* (2013.01)

(58) Field of Classification Search
USPC ........................ 198/657; 48/197 R
See application file for complete search history.

(56) References Cited

U.S. PATENT DOCUMENTS

| | | | | |
|---|---|---|---|---|
| 2,304,827 A | * | 12/1942 | Jewell | 208/153 |
| 2,497,628 A | | 2/1950 | Quist | |
| 3,775,071 A | | 11/1973 | Hoffert et al. | |
| 4,312,278 A | * | 1/1982 | Smith et al. | 110/234 |
| 4,502,820 A | | 3/1985 | Fujii et al. | |
| 4,552,490 A | | 11/1985 | Neale | |
| 4,668,130 A | | 5/1987 | Sharp | |
| 4,850,700 A | | 7/1989 | Markus et al. | |
| 6,491,501 B1 | * | 12/2002 | Wild et al. | 417/53 |
| 6,520,073 B1 | * | 2/2003 | Sorensen | 100/37 |
| 7,514,011 B2 | * | 4/2009 | Kulbeth | 210/780 |

(Continued)

FOREIGN PATENT DOCUMENTS

BE   492390 A   11/1949
DE   738492 C   8/1943

(Continued)

OTHER PUBLICATIONS

International Search Report for PCT/EP2010/000175, English translation attached to original both completed by the European Patent Office on May 6, 2011, All together 6 pages.

*Primary Examiner* — Gene Crawford
*Assistant Examiner* — Lester Rushin
(74) *Attorney, Agent, or Firm* — Dilworth & Barrese, LLP

(57) ABSTRACT

A method and to a device for delivering deliverable materials through a hollow chamber that is closed off from the outside air in a pressure-tight manner and that is supplied with materials via a storage container serving as a lock and that ends in the furnace chamber via a connecting tube. The delivery of the materials within the hollow chamber closed off from the outside air in a pressure-tight manner is carried out by means of depressurized mechanical conveyors.

16 Claims, 1 Drawing Sheet

(56) References Cited

U.S. PATENT DOCUMENTS

| | | |
|---|---|---|
| 2008/0236460 A1 | 10/2008 | Himmelfreundpointner |
| 2011/0280672 A1* | 11/2011 | Himmelfreundpointner .. 406/53 |

FOREIGN PATENT DOCUMENTS

| | | |
|---|---|---|
| DE | 1098136 B | 1/1961 |
| DE | 3718568 C1 | 6/1988 |
| EP | 140570 | 5/1985 |
| EP | 0270013 A2 | 6/1988 |
| FR | 2497503 | 7/1982 |
| FR | 2497503 A1 | 7/1982 |
| GB | 535201 A | 4/1941 |
| GB | 981996 A | 2/1965 |
| JP | 60-122629 | 7/1985 |
| SU | 1751121 | 7/1992 |
| WO | 96/30410 | 10/1996 |
| WO | 01/15797 | 3/2001 |
| WO | 2005015083 A2 | 2/2005 |
| WO | 2007035974 A1 | 4/2007 |
| WO | 2009146935 A2 | 12/2009 |

* cited by examiner

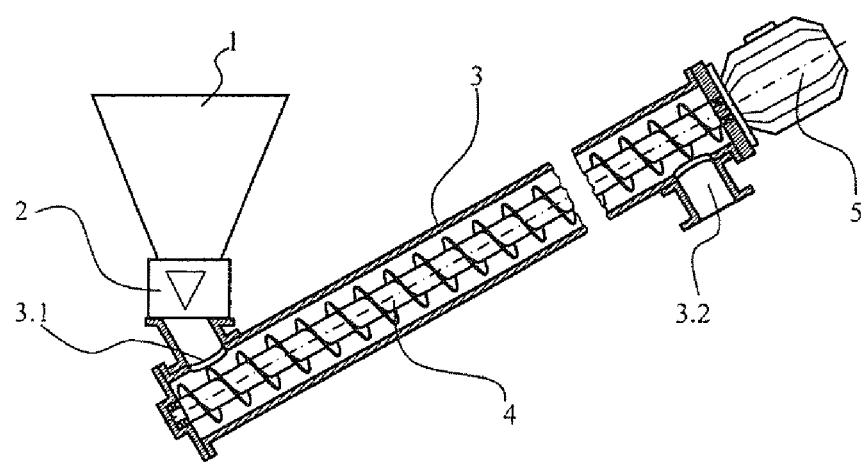

METHOD AND DEVICE FOR DELIVERING DELIVERABLE MATERIALS

CROSS-REFERENCE TO RELATED APPLICATION

This application is the U.S. national phase of PCT Appln. No. PCT/EP2010/000175 filed Jan. 14, 2010 which claims priority to Austrian application A 54/2009 filed Jan. 15, 2009, the disclosures of which are incorporated in their entirety by reference herein.

"Materials" within the meaning of this description also include mixtures of materials. These may include solid fractions and liquids, wherein the size distribution and type of the solids and also the type and proportion of the liquids contained can vary within wide ranges. "Conveyable" within the meaning of this description means that the material is flowable and/or pourable and/or pasty.

One advantageous application is the conveying of conveyable materials into reaction furnaces.

An extremely advantageous application is the conveying of conveyable materials to and into the pressure zone, which is under a considerable overpressure with respect to the atmosphere, of shaft furnaces for producing pig iron. Thus, mixtures of materials, which are otherwise to be considered problematic substances and the disposal of which as a whole incurs costs, can be used and thus also disposed of in a profitable manner and, considered as a whole, so as to reduce environmental pollution. Typical mixtures of materials that come into question for this purpose contain carbon or carbon compounds, such as oils, fats, paints, tar, adhesives, and iron-containing swarf, dust, scale, slags as are produced in the production and processing of steel.

According to DE 37 18 568 C1, a flowable material, which consists of carbon granules and water, is fed through a thick-matter pump to a fluidized-bed combustion process. In order that the material can be pumped sufficiently well (has "sufficient hydraulic conveyability"), water is added to the granules in a plurality of mixers, which also reduce the grain size of the granules. The flowability thereof is continuously measured in the process. As soon as the material is sufficiently flowable, it is pumped into the combustion process. The method is not robust enough for mixtures of materials as described in the preceding paragraph; the addition of water constitutes a considerable disadvantage, at any rate with regard to the energy balance, for the subsequent combustion process.

WO 2007/035974 A1 describes the pressurized feeding of a flowable substance which can contain solid and liquid proportions to processing plants, in particular combustion furnaces. The substance to be processed is first mixed, then conveyed in an unpressurized manner to the processing plant as close as possible to the point of introduction and then introduced into the processing plant in a pressurized manner by a pump. Unpressurized conveying, typically by way of shaftless screw conveyors, is generally quite robust with respect to fluctuations in the properties of the material to be conveyed. Since, in addition, pressurized conveying ultimately takes place only over a very short path, it is possible with the teaching of WO 2007/035974 A1 also to feed the initially mentioned material mixtures, which contain iron and carbon and are problematic in terms of conveying, into the pressure zone of shaft furnaces for producing pig iron. The most significant remaining disadvantage is uncomfortably high wear caused by abrasion by those plant parts of the pressurelessly operated conveying section which are in contact with the material to be conveyed. The object underlying the invention consists in creating a method and a device for conveying conveyable materials which can be mixed from liquids and solids or particles. Conveying should function in a robust manner with regard to variations in composition, particle size distribution and further material properties, such as viscosity, thixotropy, etc., for example, of the conveyed material and even when the materials to be conveyed contain abrasive particles, the plant parts that come into contact therewith should be subjected to as little wear as possible.

In order to achieve the object, it is proposed that the material to be conveyed is moved within a cavity, which has a feed opening and an outlet opening for the material, both by means of a mechanical conveyor that operates in a pressureless manner and by means of a pressure pump.

Mechanical conveyors that operate in a pressureless manner within the meaning of this invention are those in which it is not required for the conveying function that a pressure in the material to be conveyed propagates along the conveying path or that a gaseous or liquid conveying medium moves the material to be conveyed, but rather the material to be conveyed is moved substantially by direct contact with a moving surface of the conveyor.

The invention is furthermore illustrated by way of example by the simple and advantageous special case that said cavity is a tube and the mechanical conveyor that operates in a pressureless manner is a screw conveyor.

At first sight, the outlay for conveying material in accordance with the invention appears to be high. In fact, however, when conveying abrasive materials, a considerable saving of costs results, as calculated over the operating time of a correspondingly operating conveying plant, compared with a mode of operation in which either only a pump or only a screw conveyor is used. Specifically, in combination, a less powerful pump and a less powerful screw conveyor can be used, and above all the combination can be operated with very low wear and with quite low expenditure of energy, which means that the costs in relation to operating hours are very low.

The invention is explained in more detail by way of a drawing:

FIG. 1: shows a partial section view of a basic diagram of an exemplary embodiment of a screw conveyor operating according to the invention.

The material to be conveyed passes via the filling hopper 1 into a pump 2. Suitable as the pump 2 are the pumps available on the market as "thick-matter pumps". Very good experience has been gained by using eccentric screw conveyors as the pump 2.

The pump 2 presses the material to be conveyed through a feed opening 3.1, which is arranged in the vicinity of one end of the tube 3, and into the tube 3, which represents the conveying section. In the tube 3, the material is moved to the opposite end by the conveying pressure which the pump 2 establishes and by the axially guided screw conveyor 4, which runs in the tube 3 and is driven by a drive 5. Arranged at the end of the tube 3 opposite the inlet opening is the outlet opening 3.2 thereof, through which the material is pressed back out or drops back out of the tube 3.

If use were not made of a screw conveyor 4, but only a pump 2, then said pump 2 would have to convey at a much higher pressure in order to press the material through the rising tube 3 than is required in the arrangement illustrated. Therefore, a very much stronger and more expensive pump would have to be used than is the case with the mode of operation according to the invention. Further plant parts would also have to be designed for much higher pressure. In general, it would not be possible to overcome such great heights and such long horizontal distances with a single conveying portion and there would be greater restrictions with regard to the permissible properties of the material to be conveyed.

If use were made of only a screw conveyor 4 and no pump 2, the screw conveyor 4 would have to be arranged at least at the lower cross-sectional surface area of the tube and in a manner resting against the tube, and it would have to rotate very quickly in order to raise even somewhat liquid material or to raise a liquid proportion of the material that tends to drop down. In conjunction with hard and abrasive particles in the material to be conveyed, there would be considerable ablation of the tube wall and of the screw conveyor on account of particles of the material becoming jammed between the screw conveyor and the tube wall and on account of the high relative speed between the material to be conveyed and plant parts and between individual plant parts.

The combination of "pumping the material to be moved" and "additionally moving this material in the pumping section by a mechanical conveyor that operates in a pressureless manner" is very advantageous compared with known conveying methods and known combinations of conveying methods, since it can be used for a much wider range of materials to be moved and since an additional conveying fluid (gas or liquid) does not necessarily have to be moved together with the material to be conveyed.

It is useful to control the screw conveyor and the pump such that when too great a resistance is observed at one of the two parts pump or screw conveyor, the respectively other part is actuated at a higher drive power. The in this respect optimal settings depend on the plant dimensions and on the properties of the material to be conveyed and should be determined essentially empirically.

If for some reason the screw conveyor has to be stopped with the tube filled, the screw conveyor 4 can nevertheless be moved from time to time or continuously somewhat slowly in order to avoid separation and packing together, i.e. to avoid a dangerous increase in the viscosity of the material to be conveyed.

On account of this stirring action and also to prevent abrasion in the gap between the tube wall and the screw conveyor, it is advantageous to select the minimum radial distance between the axially guided screw conveyor 4 and the inner lateral surface of the tube to be greater than the largest hard particles located in the material to be conveyed.

On account of the great and soft, elastic deformability of shaftless screw conveyors, when the latter are used a smaller gap can be provided between the tube wall and the screw conveyor.

It is advantageous to arrange the drive 5 for the screw conveyor 4 at that end of the tube 3 at which the outlet opening 3.2 for the material to be conveyed is located. In the region of this end, the material to be conveyed has a much lower hydrostatic pressure than at the end of the tube close to the pump. Therefore, it is easier to configure the bearing, at which the shaft which connects the screw conveyor 4 and the drive 5 runs through the end face of the tube 5, in a sufficiently pressure-tight manner in order to avoid disruptive flow of material into and through the bearing. If high pressures are nevertheless to be expected in the region of the bearing, the bearing should have a pressure lubrication applied to it from the outside.

As already mentioned at the beginning, the conveying method according to the invention can be used in an advantageous manner to introduce conveyable material into the pressure zone of shaft furnaces for producing pig iron. The relevant points of introduction into the shaft furnace are normally arranged five to fifteen meters above the point at which the material can be supplied by a vehicle. The distances in the horizontal direction are typically in the order of magnitude of 60 to 150 meters. The described conveying method according to the invention has excellent suitability for overcoming the greatest part of these distances. Only in the very last part of the entire conveying path, i.e. directly in the hot pressure zone of the shaft furnace can it be more advantageous to convey with a smaller conveying cross-sectional area and in an exclusively pressurized manner or in a combined manner which is pressurized and subjected to conveying means.

A single conveying portion, the most essential parts of which are a pump, a cavity and a mechanical conveyor that operates in a pressureless manner therein, is typically several meters, for example 10 meters, long. It is possible without problems to arrange as many individual conveying portions of this kind in a row in order that conveying sections that are as long as desired can be formed even for materials that are difficult to convey.

Preferably, on relatively long, descending or horizontally extending parts, which are not curved or are only a little curved, of relatively long conveying sections, it is possible and advantageous also to convey in a manner subjected to conveying means or supported by conveying means. That is to say, the material to be conveyed is moved in a tube in a manner at least supported by the action of a conveying means flowing in the tube, said conveying means being a medium that is capable of flowing easily, such as, typically, compressed air. To this end, the conveying means is pumped into the conveying section at the beginning of such a conveying portion and if required can be let back out again at the end of such conveying portions at a deposition point, such as a cyclone, for example. Conveying by means of conveying means is generally not as robust toward clogging as the described method, in which the material itself is pumped and in addition is moved in a pressureless manner. However, some portions, at which the risk of clogging is low from the outset, can thus be traveled through at a relatively high speed and with relatively low outlay on apparatus.

In numerous applications of the invention, it is advisable to configure the limiting walls of the cavity 3 to be hollow themselves. In this way, a heat transfer fluid can be transported in the limiting walls of the cavity 3, and the cavity 3 can be heated or cooled thereby. Heating can typically be required in order to make the material to be conveyed more flowable. Cooling can typically be required in warmer environments in order to prevent the individual components of the material to be conveyed from evaporating.

It should also be noted that it is also possible within the scope of the invention to use pressureless mechanical conveying means other than screw conveyors.

It should likewise be noted that the cavity in which conveying of material takes place according to the invention can also have a shape other than that of a tube. In addition to forming the cavity as a tube, forming it as a flexible tube will above all be frequently applicable.

The invention claimed is:

1. A method for conveying conveyable materials comprising, moving and feeding the material to be conveyed under pressure within an enclosed cavity between a feed opening and an outlet opening both by means of a shaftless screw conveyor and by means of a pressure pump, wherein, if conveying of the materials is stopped with the cavity filled, the shaftless screw conveyor can be moved intermittently or continuously slowly in order to avoid separation and packing together of the materials to be conveyed, said method further including the step of conveying the conveyable material into a reaction furnace.

2. The method as claimed in claim 1, wherein the step of conveying the conveyable material into a reaction furnace comprises conveying the conveyable material into the pressure zone of a shaft furnace for producing pig iron.

3. The method as claimed in claim 2, wherein conveying takes place in an exclusively pressurized manner in the final part of the conveying path.

4. The method as claimed in claim 1 wherein, in a part of the conveying section, conveying takes place at least in a manner supported by a conveying means.

5. A device for conveying conveyable materials by means of a pressure pump through a feed opening into an enclosed cavity and through an outlet opening out of said cavity, wherein a shaftless screw conveyor is arranged in the cavity, wherein the shaftless screw conveyor can be moved intermittently or continuously slowly in order to avoid separation and packing together of the materials to be conveyed wherein said device is operatively connected with the pressure zone of a shaft furnace for producing pig iron.

6. The device as claimed in claim 5, wherein the cavity is a tube and in that the drive for the screw conveyor and the outlet opening are located in the region of the same end of the tube.

7. The device as claimed in claim 5, wherein a conveying section that operates in an exclusively pressurized manner is interposed between the device and the pressure zone of the shaft furnace for producing iron.

8. The method as claimed in claim 1 wherein, in a part of the conveying section, conveying takes place at least in a manner supported by a conveying means.

9. The method as claimed in claim 2 wherein, in a part of the conveying section, conveying takes place at least in a manner supported by a conveying means.

10. The method as claimed in claim 3 wherein, in a part of the conveying section, conveying takes place at least in a manner supported by a conveying means.

11. The device as claimed in claim 6 wherein an outlet of the shaftless screw conveyor is in material communication with an inlet of the pressure zone of a shaft furnace for producing pig iron.

12. The method of claim 1 wherein the shaftless screw conveyor and the pump are controlled such that, when resistance exceeding a predetermined magnitude is observed at one of the pump or shaftless screw conveyor, the other of the pump or shaftless screw conveyor is actuated at a higher drive power.

13. The device of claim 5 further including control means, wherein the control means control the shaftless screw conveyor and the pump such that, when resistance exceeding a predetermined magnitude is observed at one of the pump or shaftless screw conveyor, the respective other of the pump or shaftless screw conveyor is actuated at a higher power.

14. The method of claim 1 wherein the cavity is a tube.

15. A method of conveying a conveyable material from a feeder to a receiving area comprising,
Using a conveying device to convey the material, the device comprising
 a. an enclosed cavity defining a longitudinal conveying path for the material and having an inlet at the first longitudinal end for receiving the material from the feeder and an outlet at an opposing longitudinal end for delivering the material to the receiving area;
 b. a mechanical conveyor longitudinally disposed between the inlet and outlet for the pressureless propagation of the material towards the outlet;
 c. a pressure pump for the pressurized propagation of the material towards the outlet; and
 d. a means for controlling the mechanical conveyor
 such that the material is propagated along the conveying path towards the receiving area by both the pressureless mechanical conveyor and pressurized pressure pump.

16. A conveyor device for conveying a conveyable material from a feeder to a receiving area, the device comprising,
 a. an enclosed cavity defining a longitudinal conveying path for the material and having an inlet at the first longitudinal end for receiving the material from the feeder and an outlet at an opposing longitudinal end for delivering the material to a receiving area;
 b. a mechanical conveyor longitudinally disposed between the inlet and outlet for the pressureless propagation of the material towards the outlet;
 c. a pressure pump for the pressurized propagation of the material towards the outlet; and
 d. a means for controlling the mechanical conveyor,
 the mechanical conveyor and pressure pump operable such that when a conveyable material is placed in the conveying path it is propagated along the conveying path towards the outlet by both the mechanical conveyor and the pressure pump.

* * * * *